United States Patent [19]

Hall

[11] Patent Number: 4,841,774

[45] Date of Patent: Jun. 27, 1989

[54] LASER ACCELEROMETER

[75] Inventor: Lawrence H. Hall, Woodland Hills, Calif.

[73] Assignee: Litton Systems, Inc., Beverly Hills, Calif.

[21] Appl. No.: 146,274

[22] Filed: Jan. 20, 1988

[51] Int. Cl.$^4$ ............................................. G01P 15/08
[52] U.S. Cl. ................................... 73/517 R; 356/349
[58] Field of Search .................. 73/517 R, 516 R; 356/349; 372/93, 19, 37

[56] References Cited

U.S. PATENT DOCUMENTS

| | | | |
|---|---|---|---|
| 3,506,362 | 4/1970 | Doyle et al. | 356/111 |
| 3,517,560 | 6/1970 | Jacobs et al. | 73/516 |
| 3,800,594 | 4/1974 | Hutchings et al. | 73/516 R |
| 4,048,859 | 9/1977 | Babcock et al. | 73/516 R |
| 4,429,573 | 2/1984 | Walker | 73/510 |
| 4,438,517 | 3/1984 | Bobb et al. | 372/19 |
| 4,635,482 | 1/1987 | Walker | 73/517 R |
| 4,637,255 | 1/1987 | Martin | 73/517 R |
| 4,686,858 | 8/1987 | Muscatell | 73/517 B |

Primary Examiner—John Chapman
Attorney, Agent, or Firm—Roy L. Brown

[57] ABSTRACT

The apparatus of this invention uses a two-branched linear gas laser having two end mirrors and a third mirror positioned at a bend in the two-branched laser cavity. The laser cavity is bent through an angle, $\theta$, usually ninety degrees. With a bent cavity, frequency splitting occurs, and that splitting is a function of the angle $\theta$. The end mirrors and laser cavities are supported upon two beams relative to the third mirror, and or both of these beams are cantilevered relative to the third mirror. Each flexible beam supports a proof mass. Under acceleration, the angle $\theta$ changes in a reversible and reproducible manner. The beams are converted into properly oriented planar polarized waves, and the specially polarized beams then are delivered to laser beam sensors to produce electrical output signals that are a measure of the frequency splitting between the two laser modes and a measure of sensed acceleration.

9 Claims, 9 Drawing Sheets

LASER ACCELEROMETER

BACKGROUND OF THE INVENTION

The prior art is represented by U.S. Pat. No. 4,686,858 which issued Aug. 18, 1987 to Ralph P. Muscatell for a "FLIGHT INSTRUMENT USING LIGHT INTERFERENCE FOR ACCELERATION SENSING." In that patent, a mass is connected to one of several mirrors in an interferometer which causes the interference pattern to move up or down in response to the change in acceleration. The interference pattern is connected to a closed loop servo to return the mirror to its no-signal position.

U.S. Pat. No. 4,637,255, which issued Jan. 20, 1987 to Graham J. Martin, for a "NON-PLANAR RING LASER ACCELEROMETER" is assigned to Litton Systems Inc., the assignee herein. It uses a ring laser, and accelerations deform the cavity, causing frequency splitting of the polarization modes of the intracavity laser beam. The amount of frequency splitting is a measure of the magnitude and sign of the acceleration.

U.S. Pat. No. 4,635,482, which issued Aug. 5, 1985 to Clifford G. Walker for a, "SAGNAC PHASE DETECTION PASSIVE LASER ACCELEROMETER" pertains to use of a ring laser to produce a signal indicative of acceleration perpendicular to the plane of the transducing element.

U.S. Pat. No. 4,429,573, which issued June 29, 1982 to Clifford G. Walker for a, "COMMON RESONATOR PASSIVE LASER ACCELEROMETER AND GYRO" pertains to a Bragg cell device with a birefringent ring resonator.

U.S. Pat. No. 3,517,560 entitled, "Accelerometer," issued June 30, 1879 to Earl D. Jacobs and Wilbur L. Zingery. It pertains to an intracavity element linear laser accelerometer with mirror displacement as the means for sensing acceleration.

U.S. Pat. No. 3,800,594 which issued to Hutchings and Zingery on Apr. 2, 1974, pertains to an intracavity element linear laser accelerometer.

U.S. Pat. No. 4,048,859, entitled "Laser Accelerometer" issued to Gary D. Babcock on Sept. 20, 1977. It pertains to an intracavity element linear laser accelerometer.

BRIEF DESCRIPTION OF THE INVENTION

The apparatus of this invention uses a two-branched linear gas laser having two end mirrors and a third mirror positioned at a bend in the two-branched laser cavity. The laser cavity is bent through an angle, $\theta$, usually ninety degrees. With a bent cavity, frequency splitting occurs between cavity modes, which normally have mutually orthogonal polarizations that are established by magnetic fields within the laser cavity. The frequency splitting is caused by a phase shift upon reflection from the third mirror that is dependent on mode polarization. The splitting is a function of the angle $\theta$.

The end mirrors and laser cavities are supported upon cantilevered beams relative to the third mirror.

In one embodiment, there is one proof mass on the end of one of the cantilevered beams. The proof mass, for sensing acceleration, may indeed be the substrate of an end mirror. The other beam is not then cantilevered.

In a second embodiment, there are two proof masses, each supported on the end of a different one of the cantilevered beams, and these masses may also be substrates of the end mirrors.

Under acceleration, the angle $\theta$ changes in a reversible and reproducible manner. In one embodiment, co-linear to convert the beams into properly oriented planar polarized waves, a plane polarizer is set at an angle of forty five degrees relative to the axes of polarization of the original plane polarized beams. The specially polarized beams then are delivered to an optical detector whose electrical output signal has a frequency equal to the frequency splitting between the two linearly polarized laser modes and a measure of sensed acceleration.

Alternative output optics uses a quarter waveplate as a circular polarizer, a beam splitter, two linear polarizers, and two detectors to generate one electrical signal proportional to the difference frequency between the two differently polarized modes, a second signal which is a measure quadrature or of the sense of the frequency splitting, and a third signal that is a measure of the total beam amplitude. The amplitude signal is used with typical path length control circuits to tune the laser to an optimum position on the laser gain curve, typically where the beam amplitude is maximum. Such laser beam readout is an improvement of that used by Babcock in U.S. Pat. No. 4,048,859 in that it provides signals to determine the sense of rotation and to control laser cavity pathlength.

Polarizations of the modes within the laser are established by permanent magnets mounted around and spaced along the laser cavity. In a particular embodiment, the permanent magnets are positioned to subject one part of the gain region to a magnetic field oriented perpendicular to the axis of the laser gain medium and another part of the gain region to a second magnetic field perpendicular to both the axis of the laser gain medium and the first field.

Preferably, only laser modes along the axes of the laser cavity are used. To suppress other lasing lines the mirrors are preferably constructed of a thin film dielectric tuned to the desired passband. Further, the thin film dielectric is balanced and oriented to cause both modes to have the same polarizing losses at the angle of incidence of the laser beam.

Mode control occurs by choosing a particular gas composition and pressure, or it occurs by placing a mode-suppressing aperture in the gain bore.

The path length control may be exerted by sampling the laser beam through one of the mirrors and using that sample to servo the position of one of the end mirrors.

The accelerometer body is fabricated of a material with a very low coefficient of thermal expansion such as Zerodur. Zerodur is a partly crystal, partly amorphous glass-ceramic material.

The L-shaped ($\theta$ equals ninety degrees) configuration is a very simple design. It uses no Bragg cells, and only three mirrors. The fabrication cost of the apparatus of the invention is less, and assembly is easier, than prior art apparatus such as that described by G. Martin in U.S. Pat. No. 4,637,255. No separate birefringent optical element is required in the beam inside the laser cavity. Consequently light scattering and temperature problems associated with such birefringent element, present in some prior art apparatus, are avoided.

In summary, advantages of this linear laser accelerometer compared to other state-of-the-art accelerometers include high accuracy, high sensitivity, high linearity and high repeatability due to low mechanical hysteresis and creep, wide dynamic range, no rotating parts, low operating power requirements, inherently digital output, and rugged construction.

It is, therefore, an object of this invention to measure acceleration.

It is a more specific object and feature of this invention to measure such acceleration with a simple, easily manufactured assembly.

It is still a more specific object and feature of this invention to use a cantilevered laser as an accelerometer.

Other features will become apparent from the following description, taken together with the accompanying drawings.

DETAILED DESCRIPTION OF THE PREFERRED EMBODIMENTS

Figure 1:
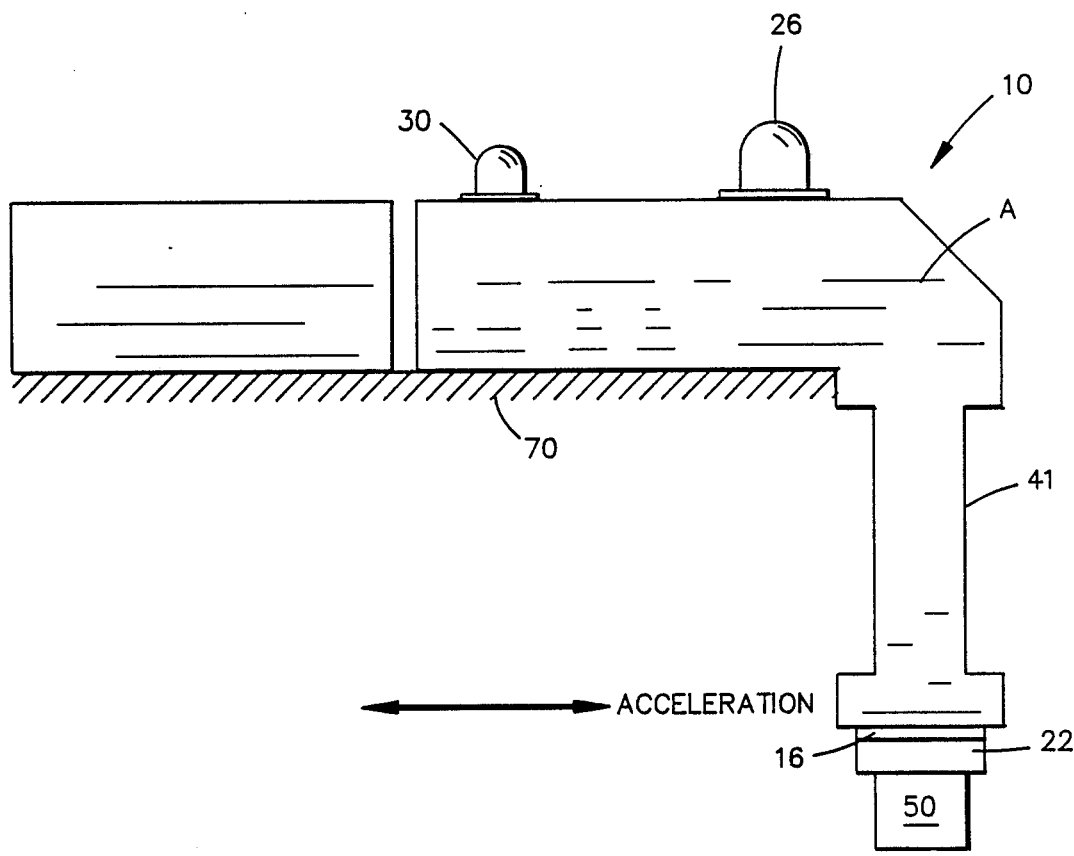
FIG. 1 is a plan view of a first embodiment of apparatus according to this invention.

Referring to the Figures a substantially temperature-insensitive L-shaped body 10, perhaps fabricated of Zerodur, has an L-shaped two-branched laser cavity 12, substantially coaxial therewith. The laser cavity 12, for example, may have a bore diameter on the order of 0.1 inch. It is terminated by the mirrors 14, 16, and it has a corner mirror 18. The angle $\theta$ between the two branches is usually on the order of ninety degrees. The mirror 14 is partly transmissive to deliver a laser beam. The mirrors 14, 16, 18 are typically high-Q dielectric films on substrates 20, 22, 24, respectively, which are also preferably fabricated of Zerodur or an equivalent material.

The diameter of the bore of the two-branched laser cavity 12 is shown larger than it usually would be, for keeping it small is one way to suppress unwanted modes of oscillation. In a typical apparatus, with a helium-neon gas mixture, the diameter of the bore 12 would be on the order of 0.1 inch. A typical thickness of the apparatus is 1.5 inches.

A cathode 26 is open through a branch cavity 28 to the main laser cavity 12. Similarly, an anode 30 is open through a branch cavity 32 to the main cavity 12.

The region 34 of the cavity 12, between the cathode 26 and the anode 30, is called the gain region of the laser. A voltage between the cathode 26 and anode 30 delivers energy to the gain region of the laser.

Figure 7:
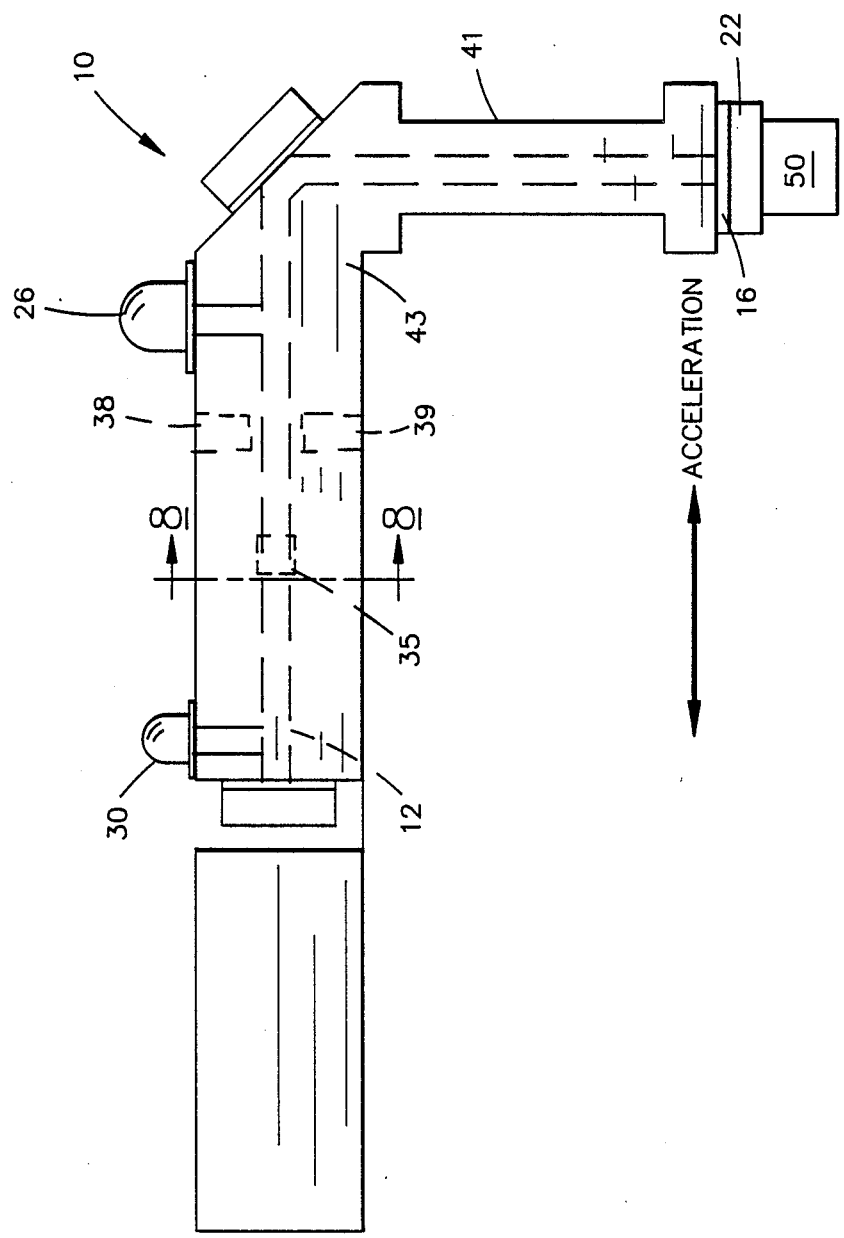
FIG. 7 is a diagram of a typical magnet configuration for perpendicular magnetic fields in the gain region of the laser.
Figure 8:
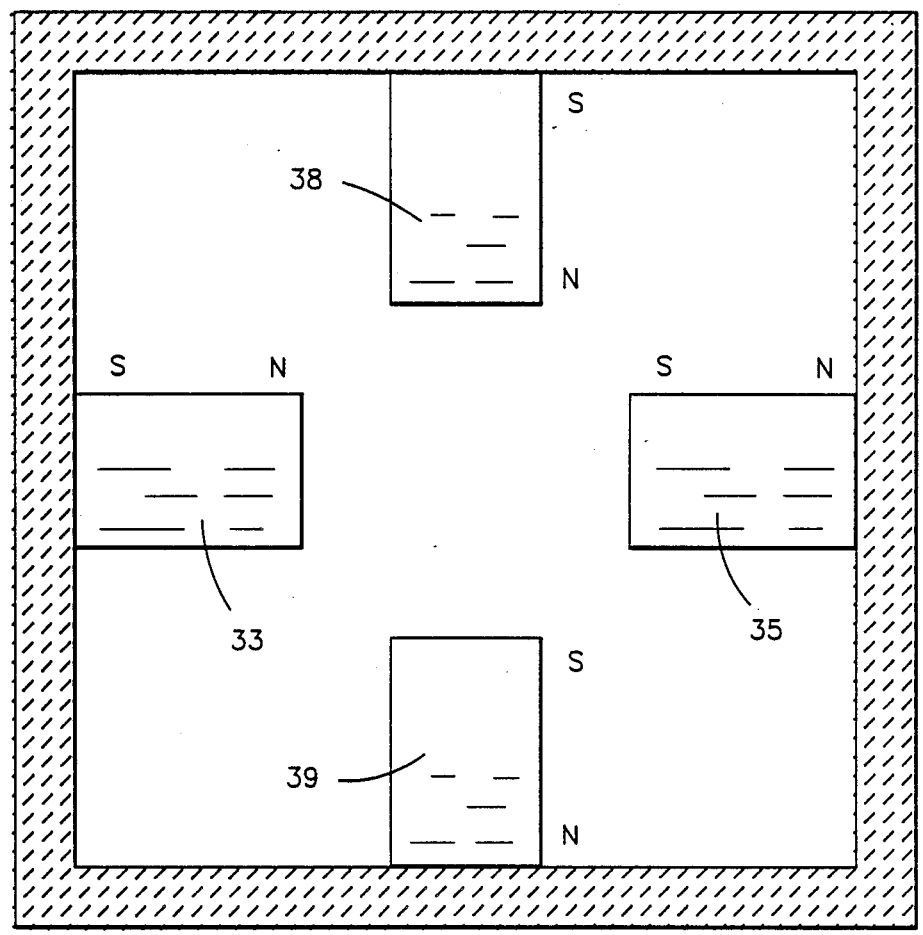
FIG. 8 is a view taken at 8—8 in FIG. 7.

To polarize the two modes of the laser beam, six permanent magnets 36-41 produce magnetic fields across the cavity 12, perpendicular to the bore, in the gain region 34. In an alternative embodiment, shown in FIG. 7, two magnets 33, 35 produce a magnetic field perpendicular to the bore 12 of the laser. Another two magnets 38-39 create a magnetic field perpendicular to the bore 12 of the laser and to the field produced by magnets 33,35. The relative orientation of the magnets is shown in FIG. 8. The advantage of such an embodiment is that, although at increased cost and complexity, it provides better mode control than the first embodiment.

The output beam is constituted of two co-linear polarization modes each with orthogonal polarization. The dielectric surface of the mirror 18 has a thickness on the order of one micron. For additional mode control the laser mirrors are designed with careful specification of their dielectric layers to produce substantially identical losses for both polarization modes.

A proof mass 50 is attached to the substrate 22, and the portion 41 of the frame 10 is reduced in section. It typically is on the order of ¼ inches thick. If desired, the proof mass may be part of the mirror substrate 22.

Figure 2:
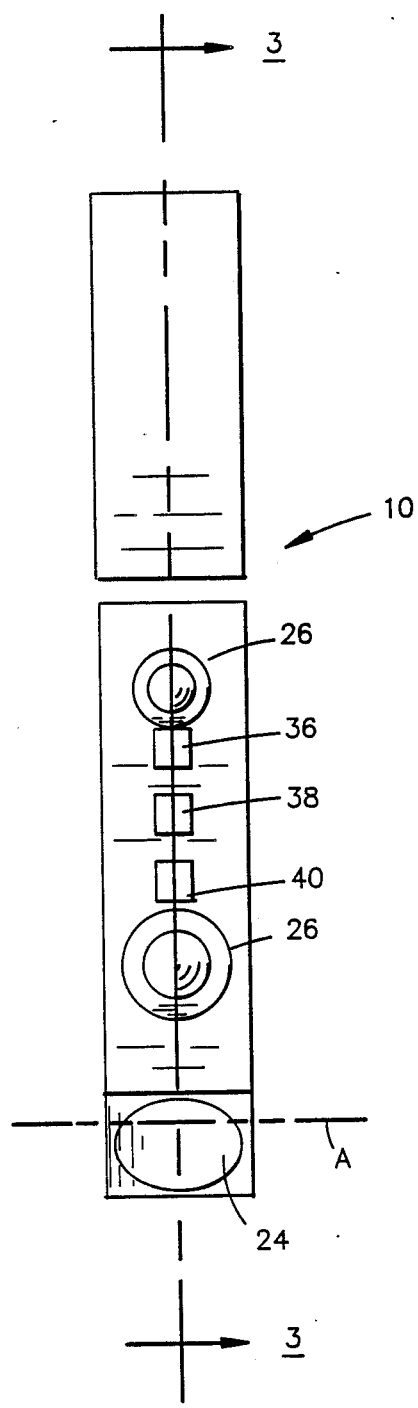
FIG. 2 is a view, taken from the top in FIG. 1.
Figure 3:
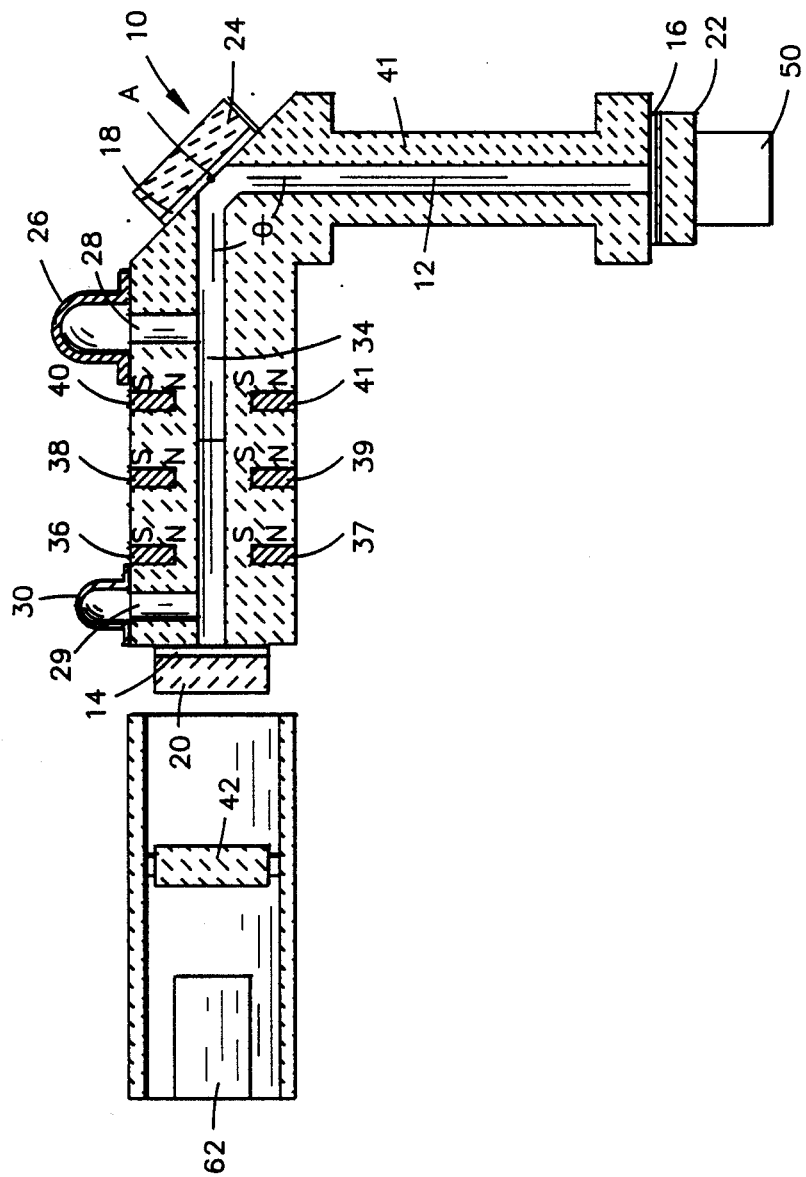
FIG. 3 is a view, partly in section, taken at 3—3 in FIG. 2.

In the embodiment of FIGS. 1-3, as acceleration occurs along the axis designated, the proof mass 50, because of its inertia, tends to move against the spring of the section 41. With a movement of proof mass 50 relative to the supporting vehicle, the angle $\theta$ changes, and the resultant change in the beat frequency between the two polarization modes is sensed by photosensor 62.

The output beam exits the laser through the substrate 20, thence through the 45 degree polarizer 42, into the light sensor 62 which senses and counts the beat frequency between the two linear polarization modes of the laser beam. The apparatus can then be calibrated, and the readout recited in terms of acceleration units.

Figure 4:
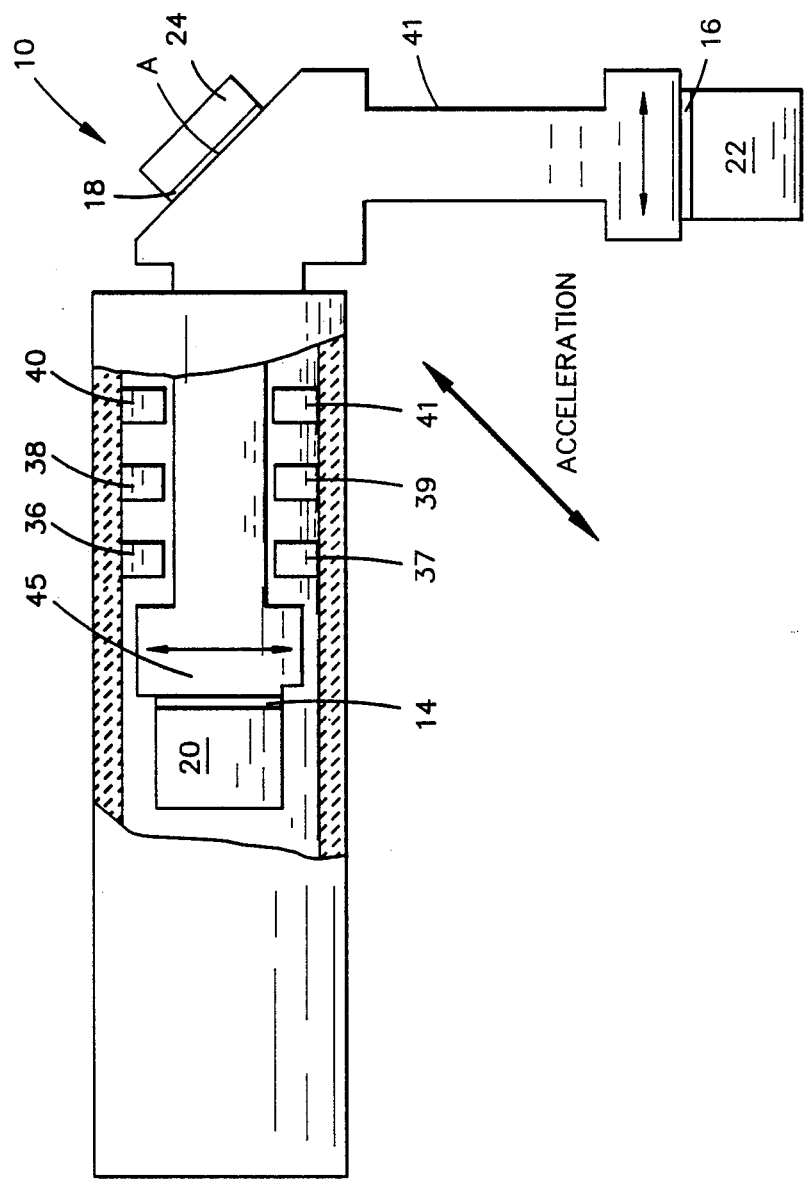
FIG. 4 is a plan view of a second embodiment of apparatus according to this invention.
Figure 5:
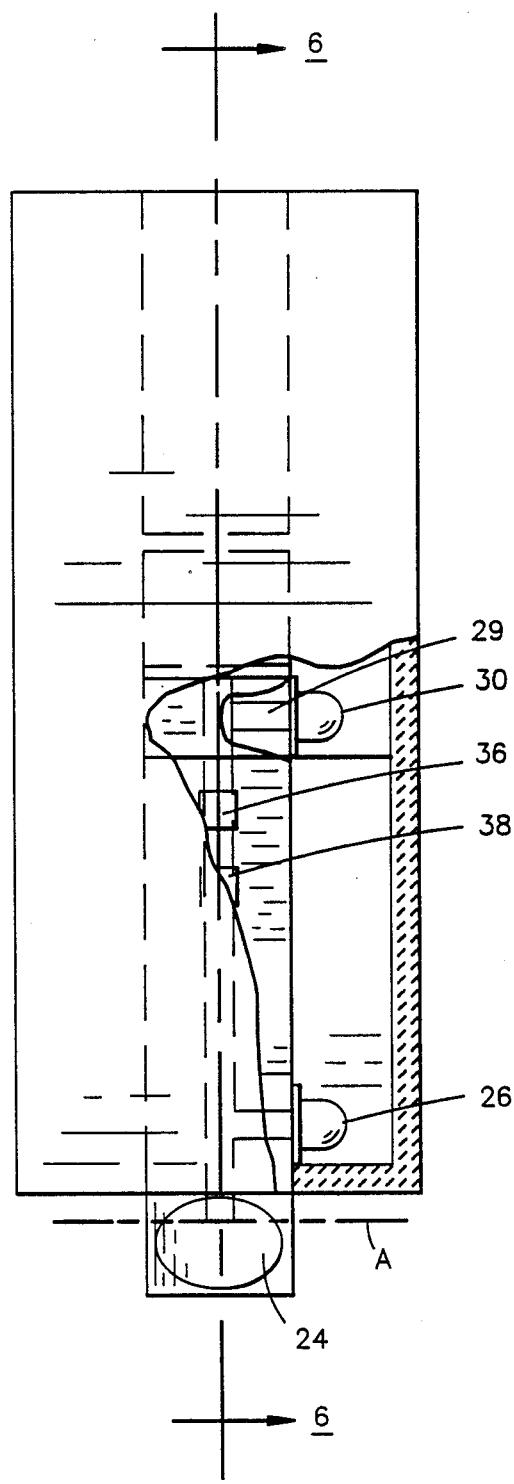
FIG. 5 is a view, taken from the top in FIG. 4.
Figure 6:
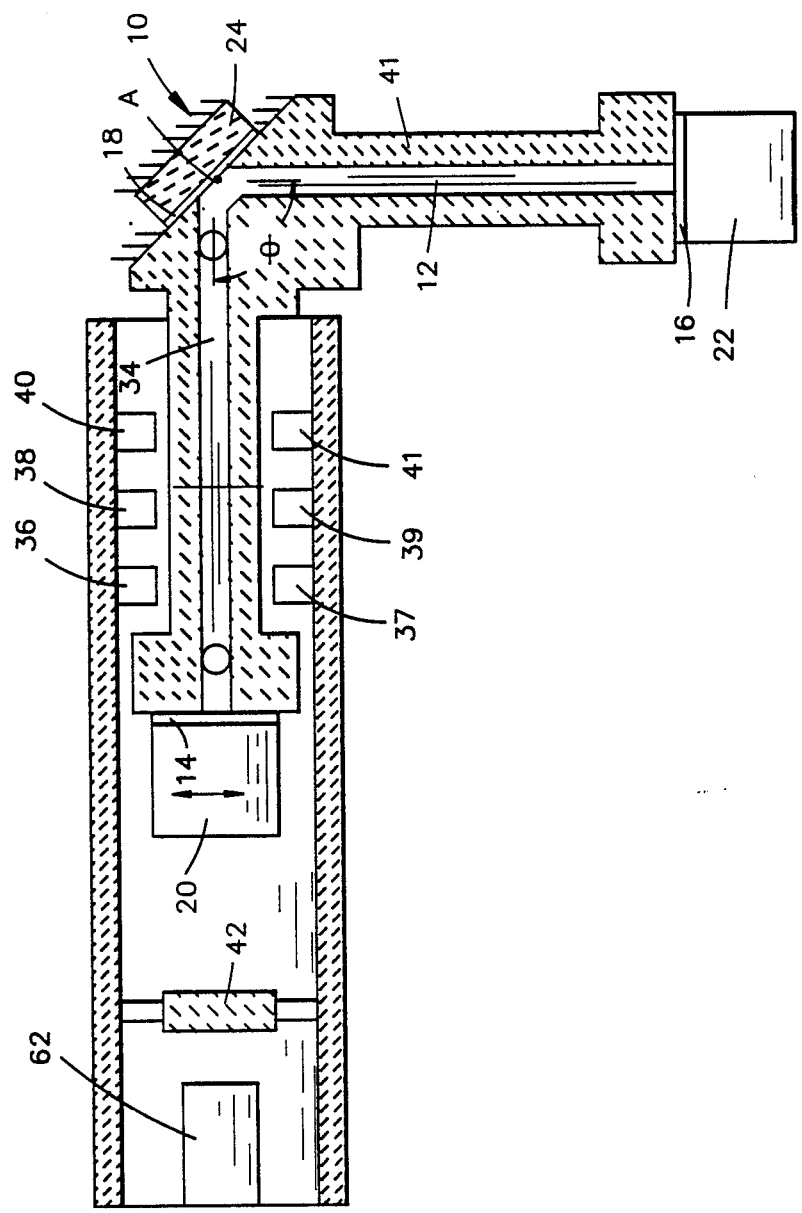
FIG. 6 is a view, partly in section, taken at 6—6 in FIG. 5.

In the embodiment shown in FIGS. 4-6, the structures supporting both branches of the laser are cantilevered and flexible to bend with applied acceleration. The direction of measured acceleration is then perpendicular to the surface of the mirror 18.

The major differences between the embodiments of FIGS. 1-3 and FIGS. 4-6 are that in FIGS. 4-6, both branches 41 and 45 of the laser 12 are substantially identical and are capable of deformation under acceleration. The gain bore is localized on the branch 45. The presence of the cathode 26 and the anode 30 may change the scale factor if they are situated on the flexible portion of the branch 45. In the shown embodiment, they are shown positioned on relatively stable portions of the apparatus. Because two branches instead of one deform under acceleration the embodiment depicted in FIGS. 4-6 has a larger scale factor than the embodiment in FIGS. 1-3, but the embodiment in FIGS. 4-6 is more complex and expensive to manufacture.

Figure 9:
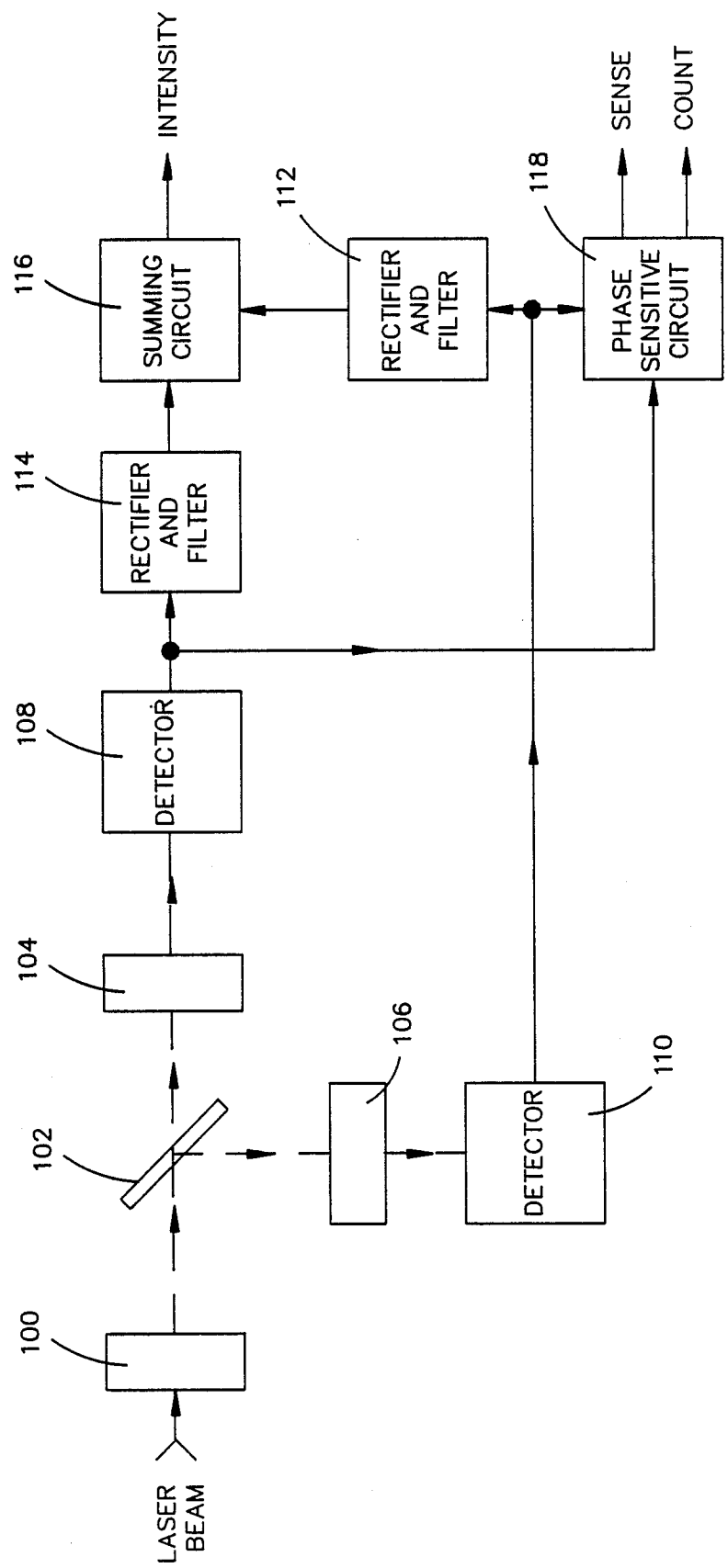
FIG. 9 is a block diagram of one preferred optical and electronic readout system.

FIG. 9 shows a block diagram of one preferred optical and electronic readout system for such an accelerometer. The laser beam is delivered through a circular polarizer 100, typically a quarter wave plate, to a beam splitter 102. The beam splitter 102 delivers beams to the linear polarizers 104 and 106. The axes of polarization of polarizers 104 and 106 are oriented perpendicular to each other. Each beam, after passing through its respective linear polarizer, is composed of two modes of slightly different frequency. The outputs of polarizers 104 and 106 are delivered, respectively, to detectors 108 and 110, which usually are avalanche photodiodes. Detectors 108 and 110 each generate an alternating signal with a frequency typically from a few kilohertz to several hundred megahertz. The detected frequency is equal to the mode splitting and is the same for both detectors. The quadrature relationship between the two signals contains information about the sense of rotation.

This information is normally extracted by a phase sensitive circuit 118. The outputs of detectors 108 and 110 are also delivered, respectively, through rectifier and filter circuits 114 and 112 to the summing circuit 116 which produces a signal that is a measure of the amplitude or intensity of the laser signal. The intensity signal may be used (by servo means not shown) to control or tune the length of the laser cavity.

Although the invention has been described in detail above, it is not intended that the invention shall be limited by that description, but only according to the claims combined with such specification.

I claim:

1. A laser accelerometer comprising:

a two-branched laser body enclosing a two-branched gas-laser cavity with laser mirrors at the ends of said cavity, one of said mirrors being partly transmissive, at least one branch of said body being flexible about a predetermined axis;

said laser cavity having a corner mirror, at the connecting corner between the two branches, that produces a differential phase shift between polarization modes, a laser gas within said cavity, and means for energizing said gas within a gain region of said cavity;

magnetic means in said gain region for polarizing laser beams produced in the laser;

a laser beam sensor positioned to receive output beams from said laser;

and a proof mass attached to the unconnected end of said at least one flexible branch of said body.

2. Apparatus as recited in claim 1 and further comprising polarizing means positioned between said beam sensor and the output mirror of said laser to intercept the output beams of said laser.

3. Apparatus as recited in claim 1 and further comprising:

a circular polarizer and a beam splitter intercepting the laser beam from said laser;

first and second beam detectors; and first and second linear polarizers for analyzing the polarization state of the said laser beam in conjunction with said detectors.

4. Apparatus as recited in claim 3 and further comprising a phase sensitive circuit connected to receive signals from said detectors and to produce signals that are a measure of the amplitude and sense of measured acceleration.

5. Apparatus as recited in claim 1 in which said body is fabricated of a partly crystal, partly amorphous glass-ceramic material having a low coefficient of thermal expansion.

6. Apparatus as recited in claim 1 wherein said gas is a neon-helium mixture.

7. Apparatus as recited in claim 1 in which said two branches of said body and said two branches of said cavity are, under no-acceleration conditions, substantially perpendicular to each other.

8. Apparatus as recited in claim 1 in which only one of the two branches of said body is flexible and is cantilevered to have an unsupported end, and said proof mass is attached to said unsupported end of said flexible branch.

9. Apparatus as recited in claim 1 in which both said branches are flexible, and there are two proof masses, one attached to the outer end of each of said flexible branches.

* * * * *